United States Patent
Wagner et al.

(10) Patent No.: US 11,614,360 B2
(45) Date of Patent: *Mar. 28, 2023

(54) OPTICAL MEASUREMENTS WITH DYNAMIC RANGE AND HIGH SPEED

(71) Applicant: VIAVI SOLUTIONS INC., San Jose, CA (US)

(72) Inventors: Christopher Russell Wagner, Kanata (CA); Luis Andre Neves Paiva Fernandes, Ottawa (CA); Joshua Benjamin Julius Philipson, Ottawa (CA)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/402,242

(22) Filed: Aug. 13, 2021

(65) Prior Publication Data

US 2022/0049989 A1 Feb. 17, 2022

Related U.S. Application Data

(63) Continuation of application No. 16/849,599, filed on Apr. 15, 2020, now Pat. No. 11,125,617.

(51) Int. Cl.
*G01J 3/26* (2006.01)
*G01J 3/02* (2006.01)

(52) U.S. Cl.
CPC ........... *G01J 3/0208* (2013.01); *G01J 3/0202* (2013.01); *G01J 3/0218* (2013.01)

(58) Field of Classification Search
CPC ........ G01J 3/02; G01J 3/28; G01J 3/14; G01J 3/18; G01J 3/26; G01J 3/00; G01N 21/44; G01N 21/65
See application file for complete search history.

(56) References Cited

U.S. PATENT DOCUMENTS

| | | |
|---|---|---|
| 5,118,926 A | 6/1992 | Gerstch |
| 5,515,169 A | 5/1996 | Cargill |
| 5,835,210 A | 11/1998 | Ershov |
| 11,125,617 B1 * | 9/2021 | Wagner ................. G01J 3/0202 |

* cited by examiner

*Primary Examiner* — Abdullahi Nur
(74) *Attorney, Agent, or Firm* — Mannava & Kang, P.C.

(57) ABSTRACT

A system for providing optical measurements and detection in optical spectrum analyzers (OSAs) with high dynamic range and high speed is disclosed. The system may include a slit to allow inward passage of an optical beam. The system may also include an optical portion to receive the optical beam. In some examples, the optical portion may include at least one optical splitter to split the optical beam into at least two optical paths. The system may also include an electrical portion to receive the optical beams split into the at least two optical paths. In some examples, the electrical portion may include at least one photodetector to receive each of the split optical beam. The electrical portion may also include at least one amplifier communicatively coupled to each of the at least one photodetector to amplify the split optical beam. The electrical portion may further include at least one analog-to-digital converter (ADC) communicatively coupled to each of the at least one amplifier to convert the split optical beams into digital signals.

17 Claims, 6 Drawing Sheets

OPTICAL MEASUREMENTS WITH DYNAMIC RANGE AND HIGH SPEED

PRIORITY

This patent application is a Continuation of commonly assigned and co-pending U.S. patent application Ser. No. 16/849,599, filed Apr. 15, 2020, the disclosure of which is hereby incorporated by reference in its entirety.

TECHNICAL FIELD

This patent application is directed to optical measurement instrumentation for telecommunication networks, and more specifically, to optical measurements and detection in optical spectrum analyzers (OSAs) with high dynamic range and high speed detection.

BACKGROUND

Optical measurement instrumentation, such as optical spectrometers or optical spectrum analyzers (OSAs), play an important role in modern scientific research. Optical spectrum analyzers (OSAs), in particular, are vital in fiber-optics and optical communication technologies. From research and development (R&D) applications to manufacturing, optical spectrum analyzers (OSAs) and other similar equipment have become essential to build and characterize a variety of fiber-optics products, such as broadband sources, optical sources, and wavelength division multiplexed (WDM) systems.

BRIEF DESCRIPTION OF DRAWINGS

Features of the present disclosure are illustrated by way of example and not limited in the following Figure(s), in which like numerals indicate like elements, in which.

DETAILED DESCRIPTION

Figure 1:
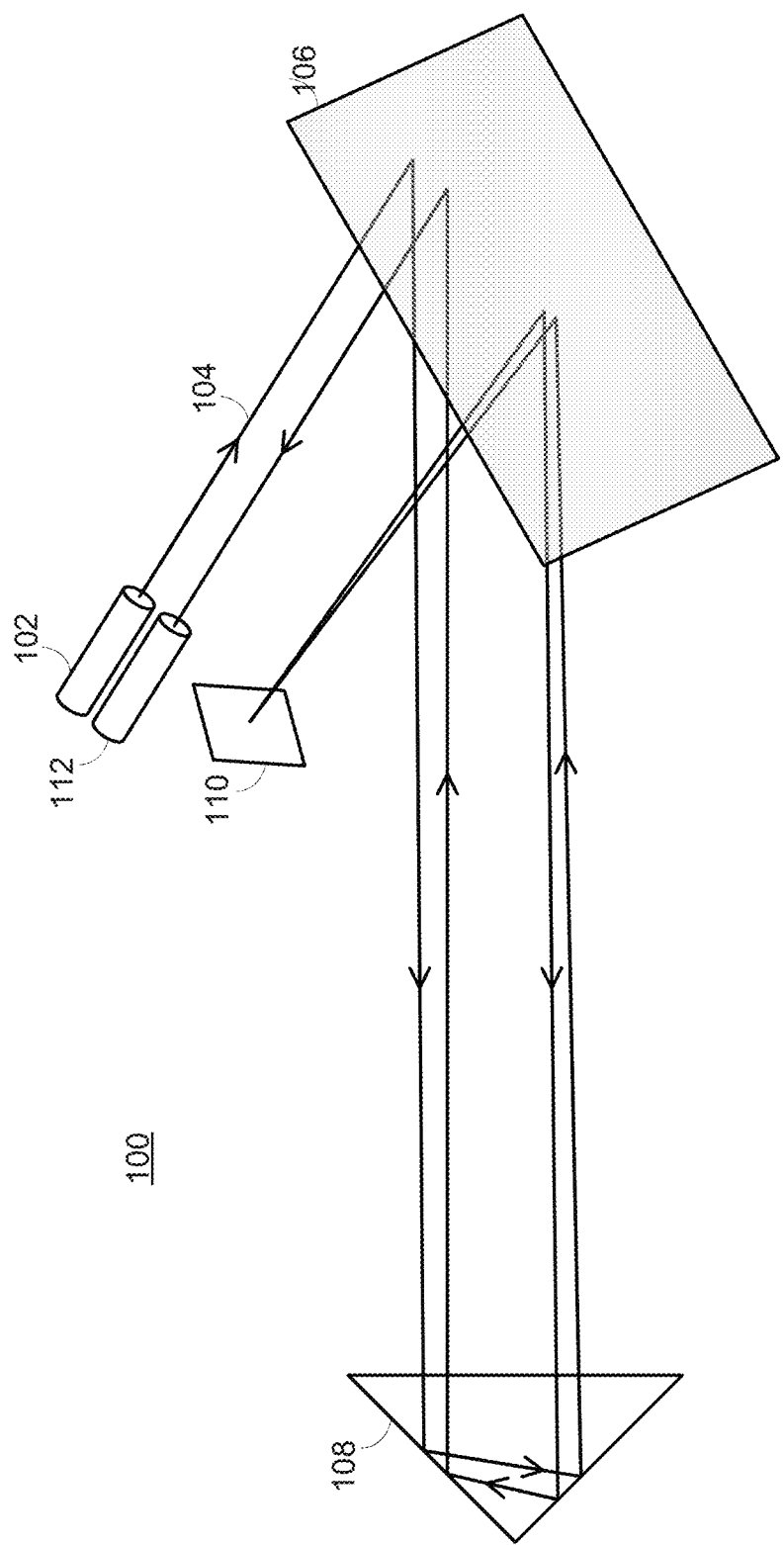
FIG. 1 illustrates a system for providing high resolution optical measurements, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

There are many types of optical spectrum analyzers (OSAs), such as Fabry-Perot-based, interferometer-based, and swept coherent heterodyne optical spectrum analyzers (OSAs). However, one of the most common optical spectrum analyzers (OSAs) for fiber-optics applications include diffraction grating based optical spectrum analyzers (OSAs). These may also be commonly referred to as monochromator-based optical spectrum analyzers (OSAs).

In a monochromator-based optical spectrum analyzer (OSA), for example, a broadband light from a bright and small light source may strike a diffraction grating. When this happens, a thin space between every two adjacent lines of the diffraction grating may become an independent "source," which may then diffract light off into a range of wavelet angles. For each wavelength and each specific angle, the diffracted wavelets may be generated at exactly one wavelength out of phase with one another, and may therefore add together constructively. In other words, light with a given wavelength may leave the diffraction grating at a specific angle. Also, the wider an illuminated portion of the diffraction grating, the higher the number of diffracted wavelets there may be, and therefore the narrower the diffracted beam pattern may become. This may enable a spectral resolution of the monochromator-based optical spectrum analyzer (OSA) to be proportional to the size of the illuminated portion of the diffraction grating.

In general, an optical spectrum analyzer (OSA) may function by angular spreading an input spectrum using diffraction orders of a grating and using a rotating reflector (e.g., a prism) to sweep through that input spectrum. For any given angle of the rotating reflector, only a small band of the input spectrum may be aligned with an output slit, which, in this case, may be composed of an optical fiber that serves as an output coupler. In some examples, the output fiber may guide an output optical beam into a detection system (e.g., photodetector system), which may be composed of various opto-electrical elements, such as photodiodes, amplifiers, and/or analog-to-digital converters (ADCs). The detection system, among other things, may measure power as function of reflector angle, which in turn may correspond to a function of wavelength.

A technical issue with conventional optical spectrum analyzers (OSAs) may include obtaining optical measurements and detection with high dynamic range and high speed detection. Although speed of rotation of the rotating reflector may help determine speed of the optical spectrum analyzer (OSA) acquisition, it should be appreciated that the circuitry of the detection system itself may also affect a maximum sweep speed. For example, this may generally be due to amplifier response time or bandwidth. In other words, the detection system may be a contributing factor that limits the maximum dynamic range of the power versus wavelength measurement in optical measurement systems using limited an amplifier with limited capabilities.

More specifically, a challenge with conventional optical spectrum analyzers (OSAs) may include achieving a speed of greater than 1000 nm/s. For example, to reach this goal, a detection system may also be required to maintain a high dynamic range (e.g., >70 dB). Log amps may be used in some scenarios, but these may prove to be particularly slow at low power levels. Linear amplifiers may be used as well, but they have proven to have low dynamic range. Switchable range linear amplifiers may be utilized, but they may be slow due to time needed to switch gain stages. These and other drawbacks may be experienced when conventional approaches are implemented, particularly with the types of amplifiers as described.

The systems and methods described herein, however, may achieve high speed optical measurements while maintaining high dynamic range without sacrificing compact designs of existing optical spectrum analyzers (OSAs). The systems and methods described herein may help reduce or eliminate all the drawbacks of the linear amplifiers. In some examples, this may be achieved by constructing a multistage parallel system without a need to switch gain ranges. In this example, all or most gain ranges may be captured simultaneously and the analog signals have been converted to digital signals with 16 bit quantization may then be stitched together.

In this way, the systems and methods described herein may cover the desired dynamic range with multiple gain stages. Using this configuration, the amplifier bandwidth may be independent on the input power which may allow for minimal distortion of the optical signal at all power levels. Digital signal processing may also be used to further improve the fidelity of the acquired spectrum. These and other benefits and advantages may be apparent in the examples outlined below.

FIG. 1 illustrates a system for providing high resolution optical measurements, according to an example. In some examples, the system 100 may depict a multi-pass optical spectrum analyzer (OSA). As shown, the system 100 may be a four-pass (4-pass or quad-pass) monochromator-based optical spectrum analyzer (OSA). The system 100 may include an input or entrance slit 102, an optical beam 104, a grating element 106, a retroreflective element 108, a mirror element 110, and an output or exit slit 112.

It should be appreciated that one or more additional optical elements may also be provided. For example, a light source (not shown) may be provided upstream of the input or entrance slit 102 to generate a broadband beam, light, or optical signal. A detection system (not shown) may also be provided downstream of the output or exit slit 11 to collect and measure the optical beam 104. Other optical elements may also be provided. For instance, one or more collimators or lenses may be provided between the input slit 102/output or exit slit 112 and the grating element 106 to collimate or focus the optical beam 104 as needed. For simplicity, the components and elements shown in system 100 may helpful to illustrate the multi-pass configuration and design to achieve a high resolution optical measurements.

The input or entrance slit 102 and output or exit slit 112 may enable or allow the optical beam 104 to pass through. In some examples, the input or entrance slit 102 and output or exit slit 112 may positioned by 1 millimeter (mm) or less apart. Other distances, dimensions, or variations may also be provided to obtain the desired optical measurement.

In some examples, the grating element 106 may be a diffraction grating. As such, the diffraction grating may be an optical component with a periodic structure that splits or diffracts light into separate beams that may also travel in different directions. In some examples, the diffraction grating may be a ruled, holographic, or other similar diffraction grating. The grating element 106 may also be configured, among other things, with various properties that include transparency (transmission amplitude diffraction grating), reflectance (reflection amplitude diffraction grating), refractive index or optical path length (phase diffraction grating), and/or direction of optical axis (optical axis diffraction grating). The grating element 106 may also be made from a variety of materials. This may include any number of isotropic materials. In some examples, the grating element 106 to be used in system 100 may be selected based on any number of factors to optimize the resolution of the optical spectrum analyzer (OSA). This may include factors, such as efficiency, blaze wavelength, wavelength range, stray light, resolving power, etc.

The retroreflective element 108 may include any number of retroreflective element configurations to provide retroreflection or other similar function. For example, the retroreflective element 108 may be a prism reflector, a flat mirror, or a mirror and lens combination. In some examples, the mirror may be a convex mirror and the lens may be a focusing lens. It should be appreciated that other retroreflective elements, configurations, or combinations of such elements or configurations, may also be provided.

Referring back to system 100 of FIG. 1, the mirror element 110 may be a flat mirror or other reflective element. These may include, but not limited to, any number of reflective materials, such as quartz, glass, metal (e.g., aluminum, etc.), silicon, or other materials with high-reflection (HR) coatings (e.g., dielectric, magnesium, fluoride, etc.).

As shown in system 100 of FIG. 1, the optical beam 104 may travel from optical element to optical element. In this case, the optical beam 104 may pass through the same grating element 106 four times between the input or entrance slit 102 and the output or exit slit 112, the multi-pass monochromator-based optical spectrum analyzer (OSA) of system 100 may be referred to as a four-pass (4-pass or quad-pass) monochromator-based optical spectrum analyzer (OSA) that is able, by design, to achieve high resolution optical measurements.

Figure 2:
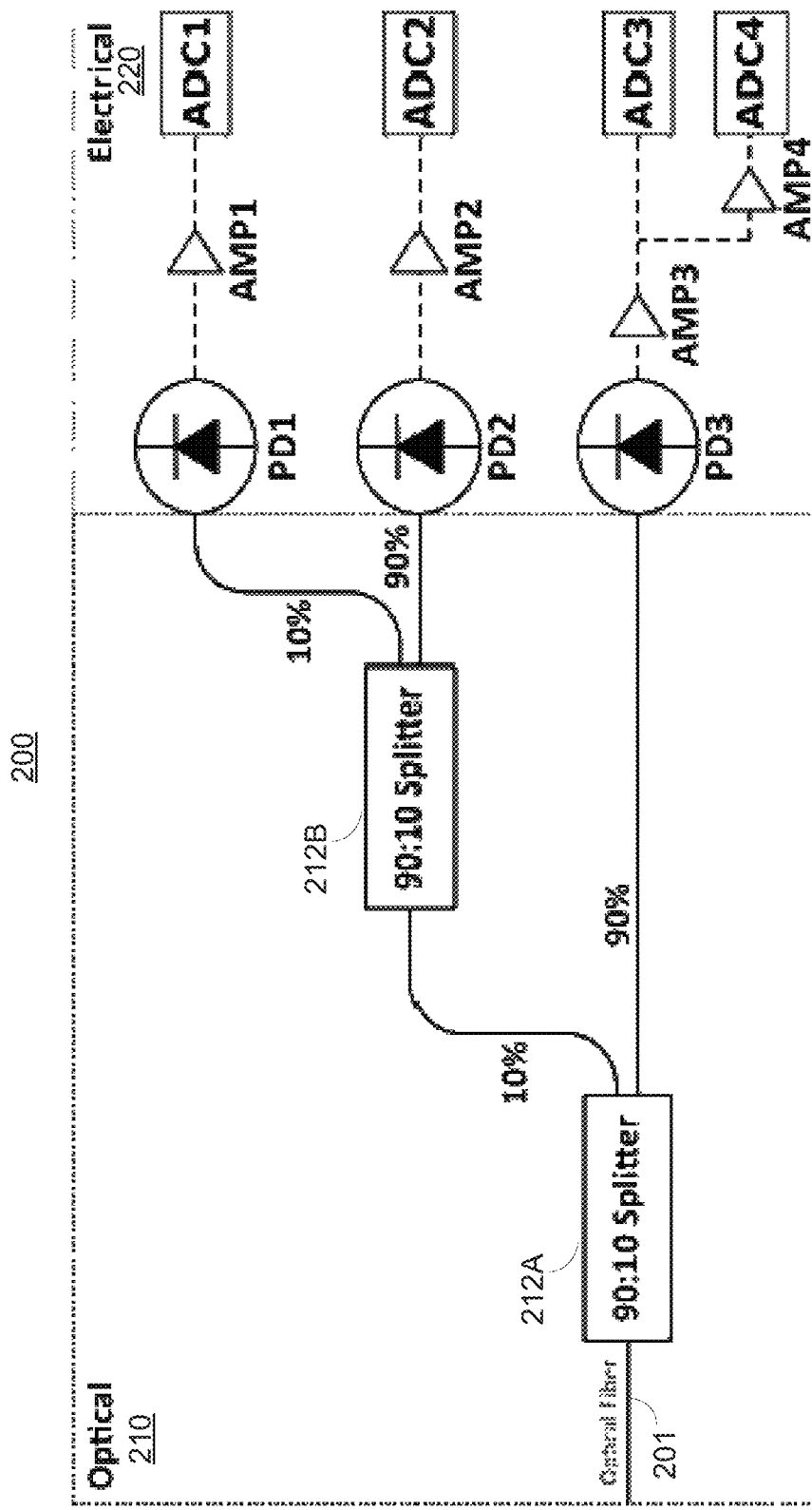
FIG. 2 illustrates a diagram for fiber delivery to photodiodes in an optical measurement system, according to an example.

FIG. 2 illustrates a block diagram 200 for fiber delivery to photodiodes in an optical measurement system, according to an example. As described above, an optical spectrum analyzer (OSA), such as the system 100 of FIG. 1, may function by angular spreading an input spectrum using diffraction orders of a grating element and using a rotating reflector (e.g., a prism) to sweep through that input spectrum. For any given angle of the rotating reflector, only a small band of the input spectrum may be aligned with the output or exit slit 112, which, in this case, may be composed of an optical fiber 201, as shown in the block diagram 200 of FIG. 2. In some examples, the optical fiber 201 may also serve as an output coupler. Furthermore, the optical fiber 201 may guide an output optical beam into a detection system (e.g., photodetector system) having an optical portion 210 and an electrical portion 220, both of which may be composed of any number of photodiodes, amplifiers, analog-to-digital converters (ADCs), and/or other opto-electrical elements. The detection system, among other things, may measure power as function of reflector angle, which in turn may correspond to a function of wavelength.

As shown, the optical portion 210 of the detection system may include one or more splitters 212, such as splitters 212A and 212B. In some examples, these splitters 212A and 212B may be asymmetric splitters (e.g., 90:10 splitters), which that direct the optical beam 104 in various directions and proportions. A 90:10 splitter, for instance, may direct 90% of the optical beam in one direction and 10% of the beam in another. Although two 90:10 splitters are shown, splitting light in three paths, it should be appreciated that other types (e.g., symmetric), numbers, and/or additional (or less) splitters may be used to direct light or the optical beam in any number of paths, directions, or proportions.

The electrical portion 220 of the detection system may include one or more photodetectors (PDs) 222, such as PD1, PD2, and PD3. Each of the PDs 222 shown in FIG. 2 may be connected to amplifiers 224, such as AMP1, AMP2, AMP3, and AMP4. In some examples, these amplifiers 224 may be linear amplifiers, or other types of amplifiers, with varying specifications that may provide for suitable (or various) gain ranges to cover any desired dynamic range. It should be appreciated that gain stages, in some examples, may be designed to have approximately a same bandwidth as was chosen to match a desired optical spectrum analyzer (OSA) resolution.

The block diagram 200 of FIG. 2 may illustrate how an optical beam 104 traverses an optical measurement system 100, as shown in FIG. 1, and through the output or exit slit 112, which may be an optical fiber 201. Once the light passes through the optical fiber 201, the light or optical signal in the optical fiber 201 may be divided by at least two splitters 212A and 212B, as shown in an optical portion 210. In some examples, these at least two splitters 212A and 212B may be asymmetric splitters that direct the light or optical signal into three paths in 90:10 proportions. These three paths may eventually carry light into an electrical portion 220. For example, these three paths may lead to at least three photodetectors, such as PD1, PD2, and PD3. Each photodetector 222, which may be a photodiode or other similar photodetector, may be communicatively coupled to an amplification circuit (or multiple stages of amplification), which may include any number of amplifiers 224. As shown, there may be at least four (4) amplifiers 224, such as AMP1, AMP2, AMP3, and AMP4, which may direct the signal eventually to one or more analog-to-digital converters (ADCs) 226, such as ADC1, ADC2, ADC3, and ADC4.

Each of the optical fiber paths may carry a specified ratio of light in such a way that the lowest gain detection stage (e.g., PD1, AMP1, ADC1) may receive the lowest amount of light and the highest gain stage (e.g., PD3, AMP3/AMP4, ADC3/ADC4) receive the largest ratio of optical light. Although at least two splitters 212A and 212B may be asymmetric splitters that direct the light or optical signal into three paths in 90:10 proportions, as shown, it should be appreciated that any other ratio may be used to maximize the dynamic range while maintaining some overlap between each amplifier's range. This overlap may be necessary for stitching to be accomplished without gaps. For this optimization, wavelength dependent responsivity of the PDs may need to be considered, as well as bandwidth of amplifiers, and wavelength dependent coupling ratios and optical insertion loss of the splitters. The 90/10 ratio, therefore, may simply be one of any number of exemplary proportions or ratios.

Although the block diagram 200 of FIG. 2 is directed to delivery of data via optical fibers, it should be appreciated that such data delivery may include other variations as well that go beyond use of fiber-pigtailed photodetector(s) in optical spectrum analyzers (OSAs). For example, this may include any number of "free-space coupled" splitter variants for open-air stitched-PD schemes. In fact, instead of fibers or fiber-based splitters, it should be appreciated that other circuitry with "bulk" optical elements, such using mirrors, prism based splitters, lenses to focus light into PD, etc., may also be used to propagate the light or data signals. Accordingly, the block diagram 200 is illustrative and not limited only to optical fiber delivery.

Figure 3B:
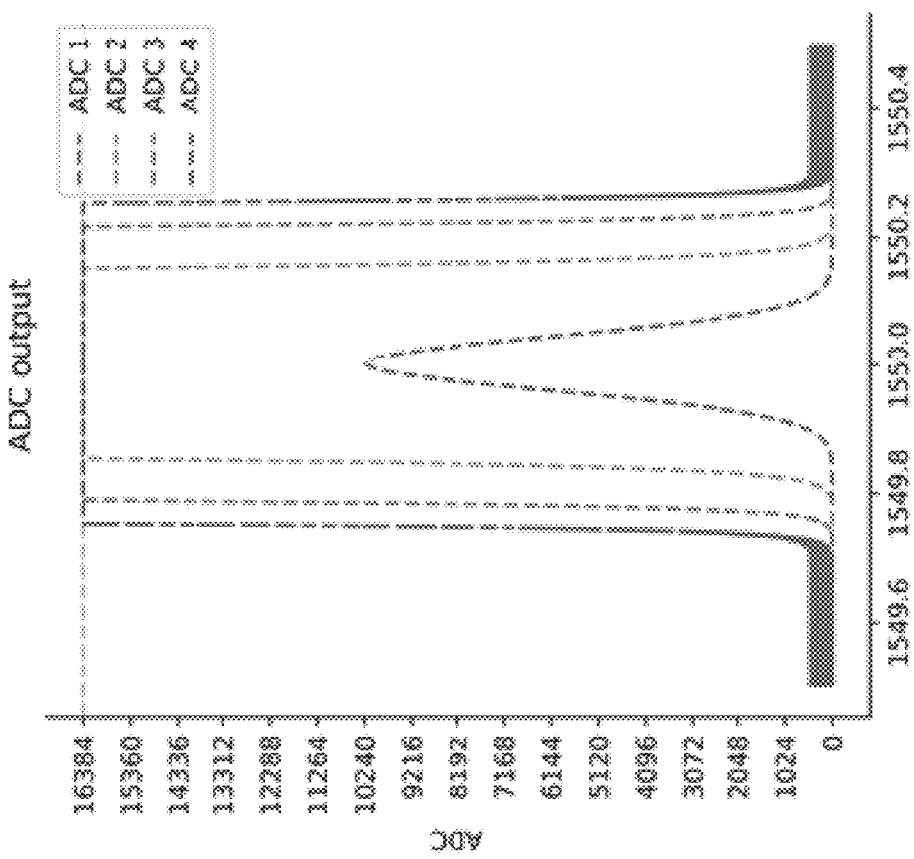
FIGS. 3A-3B illustrate graphs of analog-to-digital converter (ADC) outputs, according to an example.
Figure 3A:
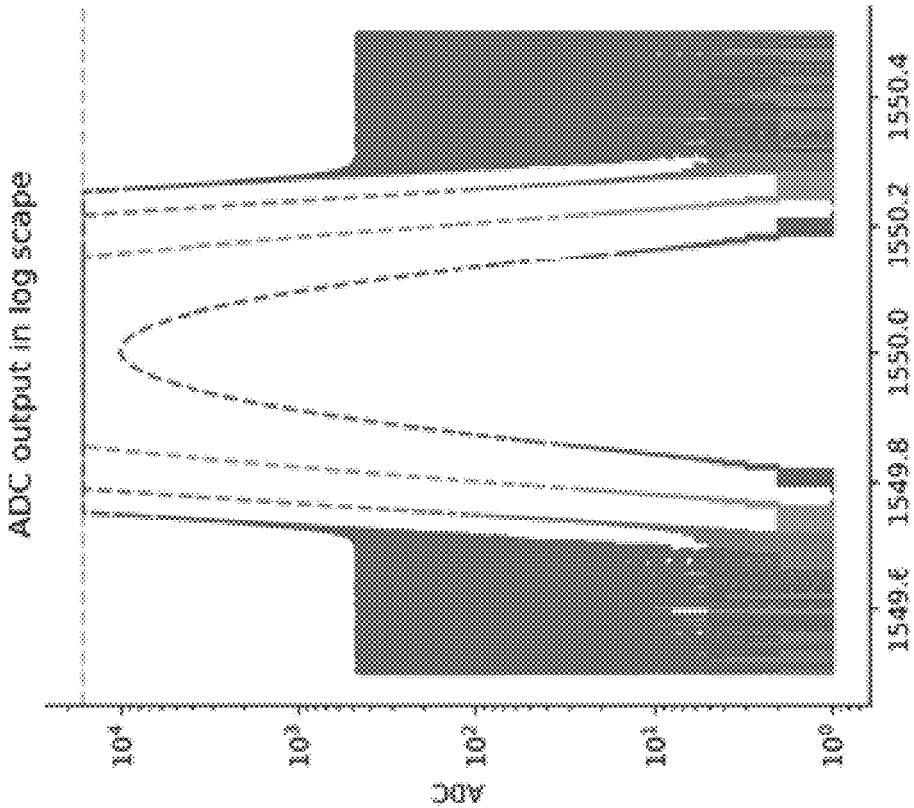

FIGS. 3A-3B illustrate graphs 300A and 300B of analog-to-digital converter (ADC) outputs, according to an example. As shown, the graph 300A may illustrate ADC output from the four analog-to-digital converters (ADCs) 226, and the graph 300B may illustrate ADC output in logarithmic scale ("log scale") from the four analog-to-digital converters (ADCs) 226. Both graphs 300A and 300B may also illustrate outputs with a Gaussian optical input of 100 picometers (pm) bandwidth. This logarithmic representation may highlight sensitivity of each ADC output at power levels closer to a lower limit for each detector path. It may also show quantization effects that happen at this lower limit. This can be seen for example with the ADC1 (blue/dashed line) data: when the power reaches a level closer to the bottom limit of ADC1, steps can be clearly seen in this log scale because ADC1 is operating at a power level close to its lower limit. From this example, the advantages of this stitching approach may become clearer since the system may then choose to use information from ADC2 (orange/dashed line), instead of ADC1. This may also exemplify a need to choose splitting ratios and ADC ranges carefully, in order to provide some overlap between a lower limit of one ADC and an upper limit of the next. As described in more detail herein, ADC outputs shown in graphs 300A and 300B of FIG. 3 may be used or processed. In some examples, these ADC outputs may be used to recover the optical power information. For example, this may be achieved by using one or more electrical constants of the optical components used in each of the detection stages.

It should be appreciated that the optical power that passes through the detection system in FIG. 2 may be converted to an ADC value by a chain of physical processes. For example, light arriving at the entrance of the detection system may be denoted as power P, for example, in the optical fiber 201, as it passes through at least one optical splitter 212A. In this scenario, there may be a certain amount of intrinsic insertion loss and a transmission ratio to each port. The compound effects of all possible splitters and losses, in a given path, may then be represented by an effective transmittance T for that path. Light power P arriving at each photodiode may then be converted into an electrical current by the responsivity R of the photodiode. This electrical current may then be converted into electrical voltage by the amplifier with gain G. The voltage may then be measured or calculated by each ADC by being converted into a digital number A, where A may be between 0 and the maximum quantization of the ADC (e.g., $2^{14}-1$, in this example, 14-bit quantization). The ADCs may have a maximum voltage that is represented by the saturation voltage Vs. Thus, the entire conversion may be summarized by the following equation:

$$A = \frac{P \cdot R \cdot T \cdot G}{V_S}(2^{14} - 1).$$

Here, the ADC values may be converted back to optical power by the inverse equation:

$$P = \frac{A \cdot V_S}{R \cdot T \cdot G \cdot (2^{14} - 1)}.$$

In this example, a dark current of the PDs may be ignored for simplicity of calculation. However, a real implementation may need to be calibrated after being assembled, to determine an exact conversion between input power and ADC values. It should be appreciated that the constants shown in the equation may be simplified to a single constant that produces the conversion (measured during calibration). The equations shown above may also be wavelength dependent because some, but perhaps not all, of the system components may be dependent on the wavelength. Again for simplicity, a wavelength dependent calibration may therefore be a trivial extension. It should be appreciated that each converted power spectrum (e.g., one for each of the amplification paths of FIG. 2) may have a saturation level and a minimum power level. As a result, this information may need to be further processed. For example, each converted power spectrum may be "stitched" together, as described below.

Figure 4:
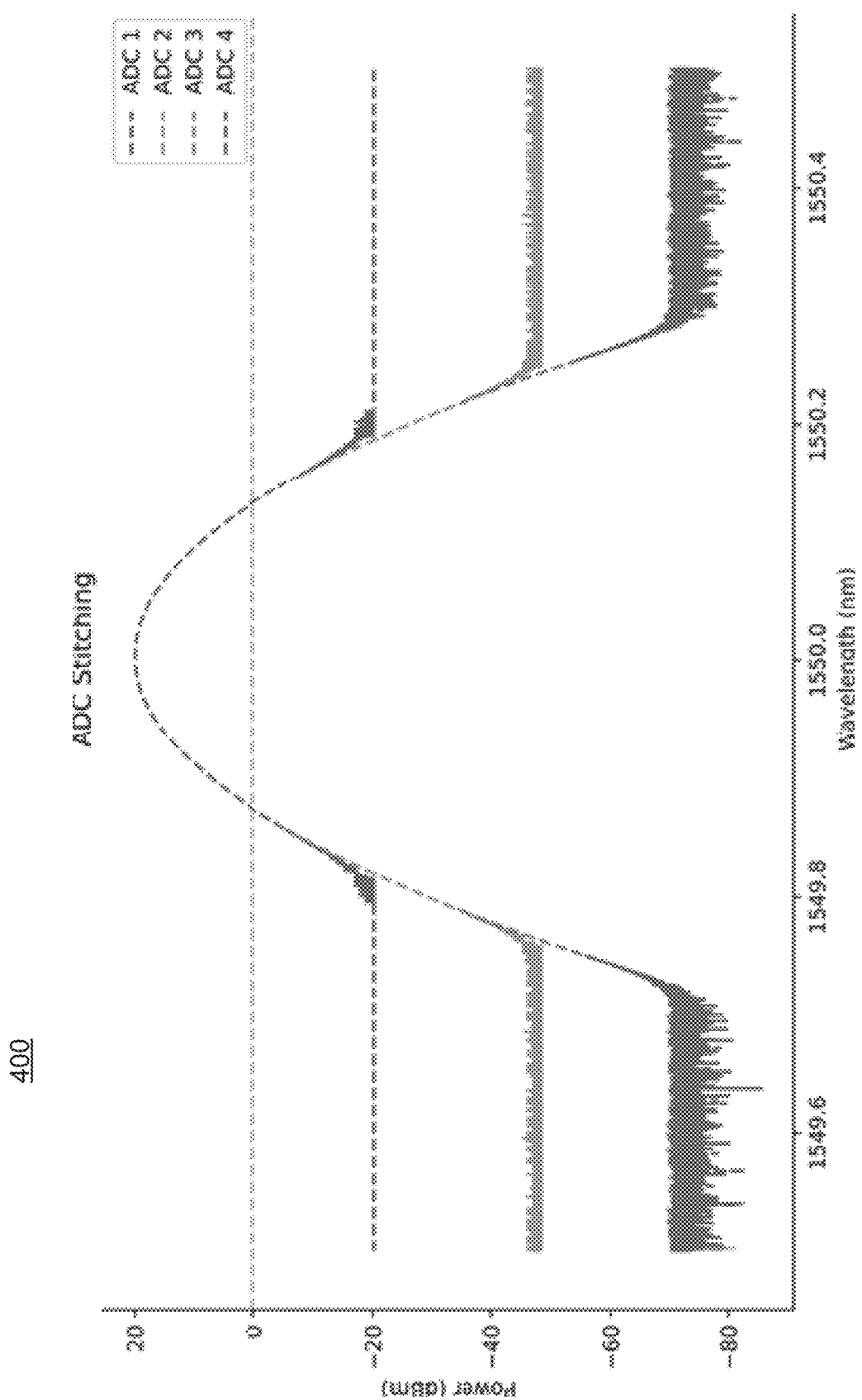
FIG. 4 illustrates a graph that stitches multiple analog-to-digital converter (ADC) outputs, according to an example.

FIG. 4 illustrates a graph 400 that stitches multiple analog-to-digital converter (ADC) outputs, according to an example. As shown in graph 400, the four ADC outputs after converting the measurements from digital values to optical power using the constant of the system, for example, may be combined or "stitched" together using a stitching technique or other similar approach. The stitching technique, for example, may be based on one or more mathematical, image-based, or data-based algorithmic sequence. Other various examples or approaches may also be provided.

In some examples, each of the spectra recovered from each of the ADCs, for example, may be stitched or combined to recreate a signal that may represent the "original" signal with a dynamic range that is larger than what would be possible using a single photodiode and amplifier circuit. In some examples, the stitching technique may select values, at each wavelength point, from the highest gain stage that is not above a predetermined saturation level. Referring to the example shown in graph 400 of FIG. 4, when starting from the left side of the spectrum, the power value may be approximately −70 dBm and no ADCs may be in saturation. The values may be selected from ADC4 (highest gain stage) until approximately 1549.75 nm when ADC4 reaches a saturation point and values may start being selected from ADC3. At approximately 1549.8 nm, ADC3 may have reached its own saturation point and values from ADC2 may have become the relevant values for the final reconstructed spectrum. Finally, at approximately 1549.85 nm, ADC2 may have reached saturation and ADC1 (the lowest gain stage) may then become the selected path.

In some examples, a symmetric description may occur for wavelengths higher than 1550 nm where power values decrease as a function of wavelength and a choice of ADC path moves from ADC1 to ADC2 to ADC3 to ADC4. It should be appreciated that the phrase, "symmetric description," may be used herein to explain how the stitching starting from the left to the middle may then be reversed from the middle to the right. For example, from left to right: ADC4→ADC3→ADC2→ADC1→ADC2→ADC3→ADC4. This may be true because the example shown may have a Gaussian profile. As shown, the outputs for each of the ADCs 226 shown in FIG. 3 may be used to recreate an "original" signal with a dynamic range that is larger than and not possible using a single photodiode and amplifier circuit, as utilized in some conventional OSAs or related systems. Once these outputs are stitched together, a final optical spectrum may be provided.

Figure 5B:
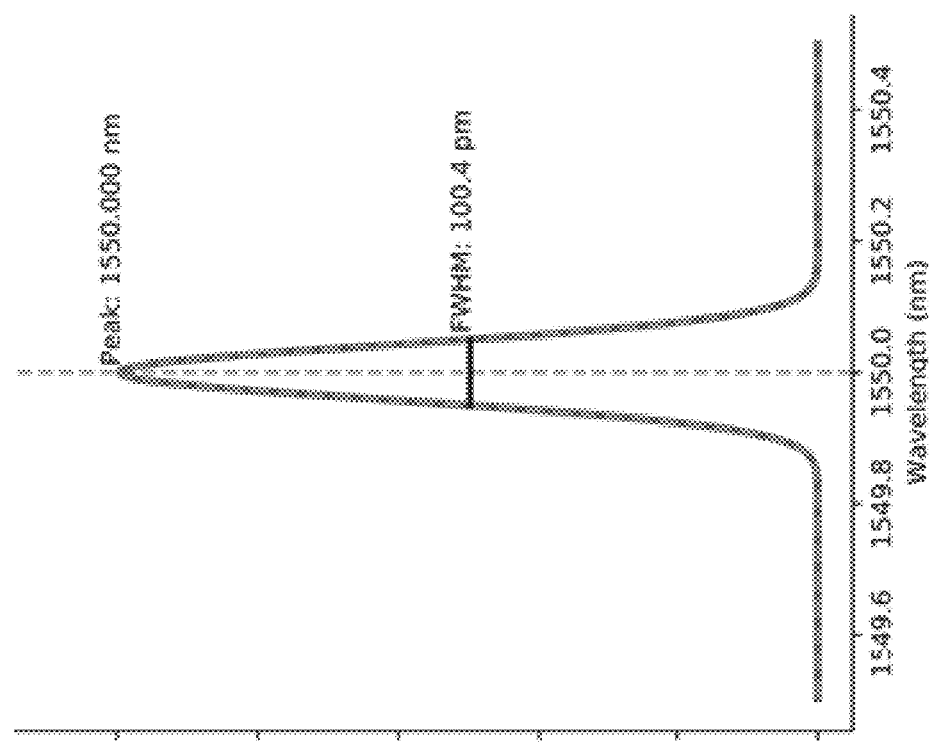
FIGS. 5A-5B illustrate graphs of reconstructed optical spectrums, according to an example.
Figure 5A:
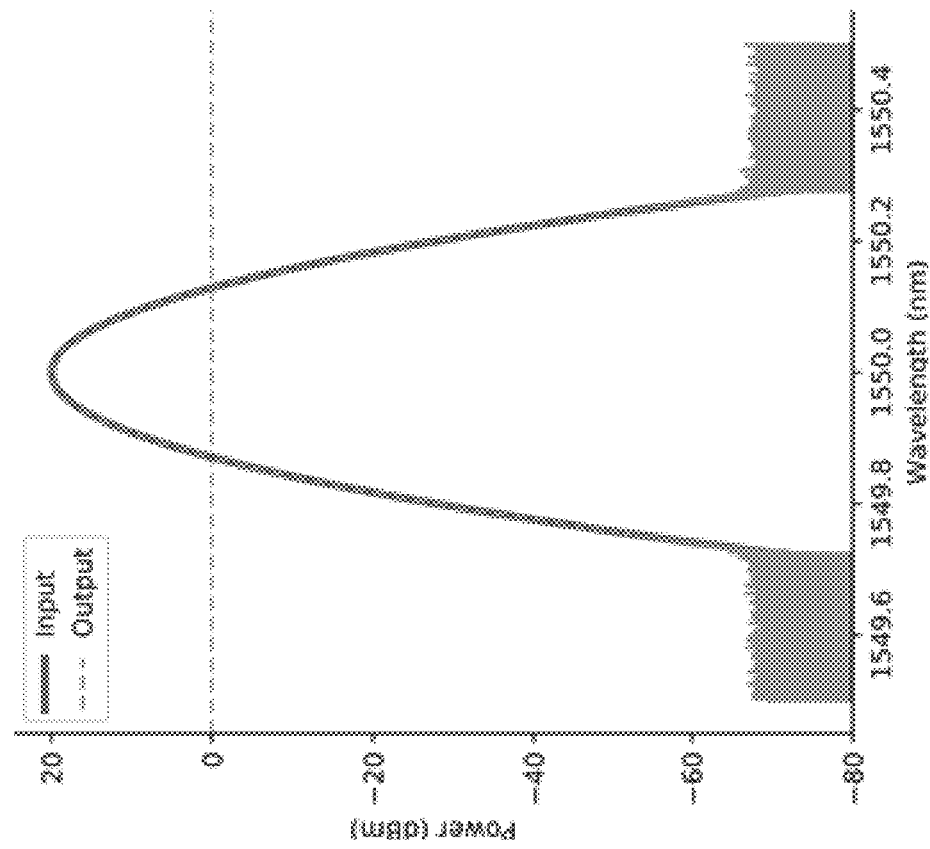

FIGS. 5A-5B illustrate graphs 500A and 500B of reconstructed optical spectrums relative to original input signal, according to an example. Both graph 500A and graph 500B may depict a reconstructed optical spectrum compared to the original input signal. In other words, graph 500A and graph 500B may be two representations of the same data set. As shown, the input (blue/solid line) may be compared with the output (orange/dashed line). The input may be the original signal used to simulate the system, and the output may be the resulting power spectrum after simulating the detection circuit and applying the conversion equations. Thus, the only difference between graph 500A and graph 500B is that the y-axis of graph 500A may show power in dBm units (log scale) and the y-axis of graph 500B may show power in mW units (linear scale).

It should be appreciated that additional signal processing of the optical spectrum may further be provided by the stitching technique or other post-stitching action. For example, distortions created by limited bandwidth of the amplification stages may be removed. Signal post processing may also become significant for measurements of narrow spectrum signals with higher or highest speeds. In other words, the additional signal processing, by use of various techniques and/or algorithms, may apply the equations described above to provide stitching. The post processing techniques or algorithms may then be applied to help eliminate or reduce distortions. In some examples, this may involve a deconvolution action or a frequency "de-filtering." Ultimately, such processing may optimize visualization and/or output quality.

Figure 6:
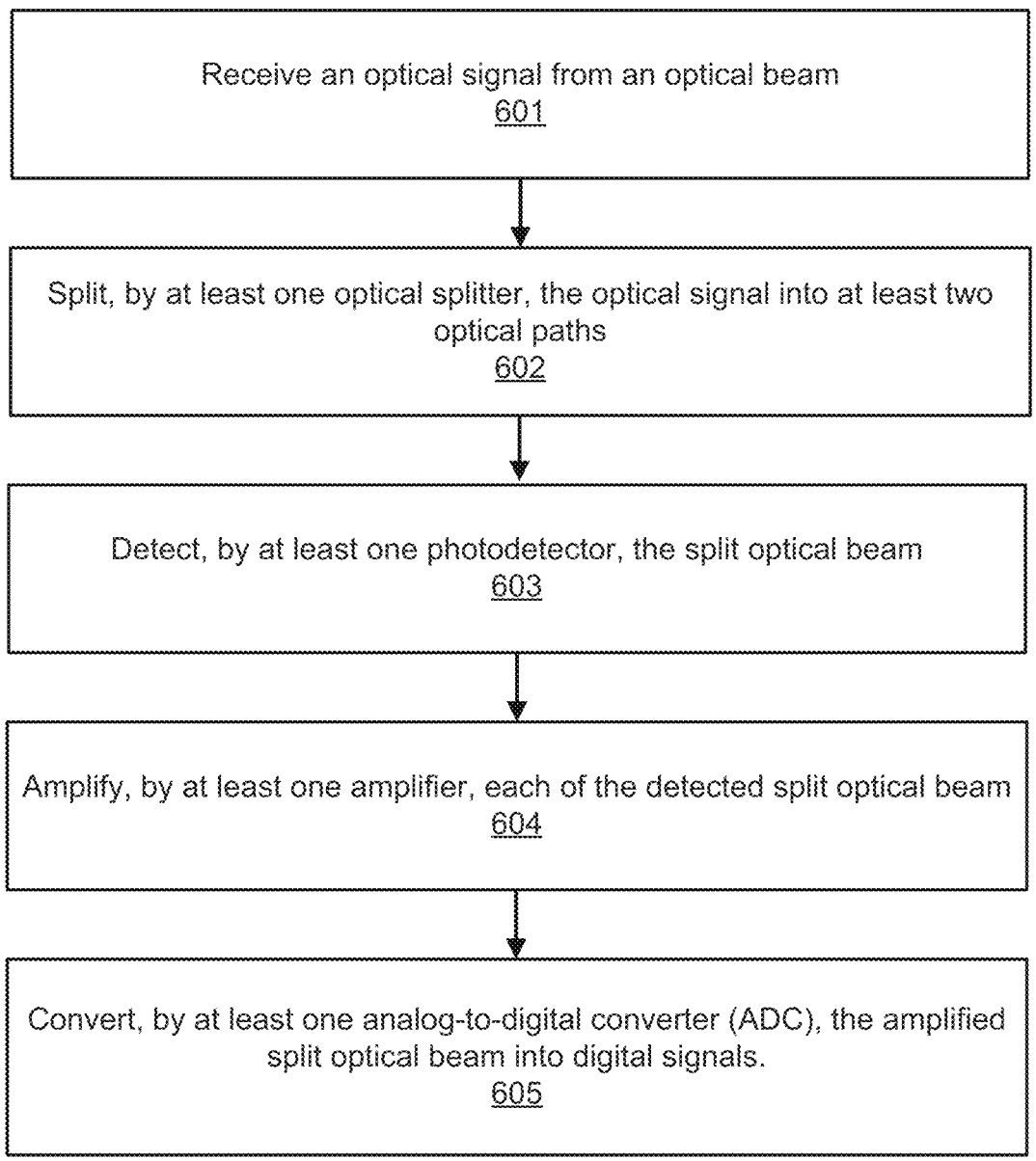
FIG. 6 illustrates a flow chart of a method for providing optical measurements using high dynamic range and high speed detection, according to an example.

FIG. 6 illustrates a flow chart of a method for providing optical measurements using high dynamic range and high speed detection, according to an example. The method 600 is provided by way of example, as there may be a variety of ways to carry out the method described herein. Although the method 600 is primarily described as being performed by the system 100 of FIG. 1 and/or the system 200 of FIG. 2, the method 600 may be executed or otherwise performed by one or more processing components of another system or a combination of systems. Each block shown in FIG. 6 may further represent one or more processes, methods, or subroutines, and one or more of the blocks may include machine readable instructions stored on a non-transitory computer readable medium and executed by a processor or other type of processing circuit to perform one or more operations described herein.

At block 501, an optical signal may be received. In some examples, the optical signal may be received from an optical beam. The optical beam may original from an optical fiber 201, or other optical communication medium.

At block 502, the optical beam may be split into at least two optical paths. In some examples, this may be achieved by using at least one optical splitter, such as an asymmetrical splitter, as described above.

At block 503, the split optical beam may be detected by at least one photodetector, e.g., PD1, PD2, etc., as described above.

At block 504, the split optical beam may be amplified. In some examples, the split optical beam may be amplified using at least one amplifier, e.g., AMP1, AMP2, etc., as described above.

At block 505, the split optical beams may be converted into digital signals. In some examples, this may be achieved by using at least one analog-to-digital converter (ADC), e.g., ADC1, ADC2, etc., as described above.

As mentioned above, there may be numerous ways to configure or position the various optical elements of the system 100 or system 200, such as the grating element 106, the retroreflective element 108, and/or the mirror 110. Adjusting these and other components may also provide more a more efficient or compact design for the optical path of the optical beam 104. In this way, other electrical, thermal, mechanical and/or design advantages may also be obtained.

While examples described herein are directed to configurations as shown, it should be appreciated that any of the components described or mentioned herein may be altered, changed, replaced, or modified, in size, shape, and numbers, or material, depending on application or use case, and adjusted for desired resolution or optimal measurement results.

It should be appreciated that the systems and methods described herein may facilitate more reliable and accurate optical measurements. It should also be appreciated that the systems and methods, as described herein, may also include or communicate with other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back-end to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the optical measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Although examples are directed to test and measurement systems, such as optical spectrum analyzers (OSAs), it should be appreciated that the systems and methods described herein may also be used in other various systems and other implementations. For example, these may include an ultra-narrow band tunable filter, an extended cavity diode laser, and/or applied stages to further increase the spectral resolution of various test and measurement systems. In fact, there may be numerous applications in optical communication networks and fiber sensor systems that could employ the systems and methods as well. The detection scheme described herein may have benefits in creating a large dynamic range without compromising speed, which may be a desirable feature in optical power monitors or other similar systems.

It should be appreciated that the systems and methods described herein may also be used to help provide, directly or indirectly, measurements for distance, angle, rotation, speed, position, wavelength, transmissivity, and/or other related optical measurements. For example, the systems and methods described herein may allow for a higher resolution (e.g., picometer-level) optical resolution using an efficient and cost-effective design concept. By overcoming drawbacks of single linear amplifiers, a larger dynamic range with multiple gain stages may be covered using the systems and methods described herein. With this configuration, amplifier bandwidth may be independent on input power, which may allow for minimal distortion of optical signals at most or all power levels. Furthermore, signal processing may be used to further improve the integrity and fidelity of any acquired spectrum using the techniques described herein.

With additional advantages that include high resolution, low number of optical elements, efficient processing techniques, cost-effective configurations, and small form factor, the systems and methods described herein may be beneficial in many original equipment manufacturer (OEM) applications, where they may be readily integrated into various and existing network equipment, fiber sensor systems, test and measurement instruments, or other systems and methods. The systems and methods described herein may provide mechanical simplicity and adaptability to small or large optical measurement devices. Ultimately, the systems and methods described herein may increase resolution, minimize adverse effects of traditional systems (e.g., using single linear amplifiers), and improve measurement and processing efficiencies.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system, comprising:
    at least one optical splitter to split an optical beam into at least two split optical beams;
    at least one photodetector to receive the split optical beams;
    at least one amplifier communicatively coupled to the at least one photodetector to amplify the received split optical beams;
    at least one analog-to-digital converter (ADC) communicatively coupled to the at least one amplifier to convert the amplified split optical beams into digital signals; and
    a processor to combine the digital signals using a stitching technique, wherein the stitching technique comprises selecting values from a gain stage of the digital signals that is below a saturation level.

2. The system of claim 1, a wherein the processor is further to:
    generate an optical spectrum based on the combined digital signals, the optical spectrum representing an input optical signal.

3. The system of claim 1, wherein the values are selected, at each wavelength point, from a highest gain stage of the digital signals that is below the saturation level.

4. The system of claim 1, wherein the at least one optical splitter is an asymmetrical optical splitter.

5. The system of claim 1, wherein the at least one photodetector is a photodiode.

6. The system of claim 1, wherein the at least one amplifier is a linear amplifier.

7. The system of claim 1, wherein the system is a photodetection system for a multi-pass optical spectrum analyzer (OSA).

8. A method comprising:
receiving, at an optical portion of a detection system, an optical signal from an optical beam;
splitting, by at least one optical splitter in the optical portion, the optical beam into at least two split optical beams;
receiving, by at least one photodetector of the detection system, the split optical beams;
amplifying, by at least one amplifier communicatively coupled to the at least one photodetector, the received split optical beams;
converting, by at least one analog-to-digital converter (ADC) communicatively coupled to the at least one amplifier, the amplified split optical beams into digital signals; and
combining, by a processor of the detection system, the digital signals using a stitching technique, wherein the stitching technique comprises selecting values from a gain stage of the digital signals that is below a saturation level.

9. The method of claim 8, further comprising:
generating an optical spectrum based on the combined digital signals, the optical spectrum representing an input optical signal.

10. The method of claim 9, wherein the values are selected, at each wavelength point, from a highest gain stage of the digital signals that is below the saturation level.

11. The method of claim 8, wherein the at least one optical splitter is an asymmetrical optical splitter.

12. The method of claim 8, wherein the at least one photodetector is a photodiode.

13. The method of claim 8, wherein the at least one amplifier is a linear amplifier.

14. The method of claim 8, wherein the detection system is a photodetection system for a multi-pass optical spectrum analyzer (OSA).

15. A non-transitory computer-readable storage medium storing instructions that, when executed by a processor, cause the processor to:
receive an optical signal from an optical beam;
split the optical beam into at least two split optical beams;
receiving the split optical beams;
amplify the received split optical beams;
convert the amplified split optical beams into digital signals; and
combine the digital signals using a stitching technique, wherein the stitching technique comprises selecting values from a gain stage of the digital signals that is below a saturation level.

16. The non-transitory computer-readable storage medium of claim 15, wherein the instructions further cause the processor to:
generate an optical spectrum based on the combined digital signals, the optical spectrum representing an input optical signal.

17. The non-transitory computer-readable storage medium of claim 16, wherein the values are selected, at each wavelength point, from a highest gain stage of the digital signals that is below the saturation level.

* * * * *